United States Patent [19]
Fuhr

[11] 3,828,388
[45] Aug. 13, 1974

[54] WINDSHIELD WIPER BLADE SNOW AND ICE SCRAPER ATTACHMENT

[76] Inventor: John R. Fuhr, Stone Gate Apt., Block 7, Apt. C6, Peekskill, N.Y.

[22] Filed: Mar. 23, 1973

[21] Appl. No.: 344,226

[52] U.S. Cl. ............................... 15/250.41, 15/236
[51] Int. Cl. ............................................. B60s 1/04
[58] Field of Search............ 15/250, 250.40, 250.41, 15/250.36, 250.37, 236, 246, 256.5

[56] References Cited
UNITED STATES PATENTS

| | | | |
|---|---|---|---|
| 1,864,208 | 6/1932 | Lundberg.......................... | 15/250.41 |
| 2,154,373 | 4/1939 | Bulleigh............................ | 15/236 R |
| 3,417,421 | 12/1968 | Retke................................ | 15/250.41 |
| 3,638,274 | 2/1972 | Farver............................... | 15/250.41 |

*Primary Examiner*—Peter Feldman
*Attorney, Agent, or Firm*—Alfred E. Miller

[57] ABSTRACT

An attachment for fitting over a standard vehicular windshield wiper which scrapes snow and ice from the windshield. The scraper takes the form of a multiplicity of scraper blocks which are interconnected by chains or hinges so that the scraper blocks articulate over the outer surface of the windshield. Because of the swivel action of the scraper block segments, the curvature of any windshield is followed and effective scraping action is achieved.

8 Claims, 11 Drawing Figures

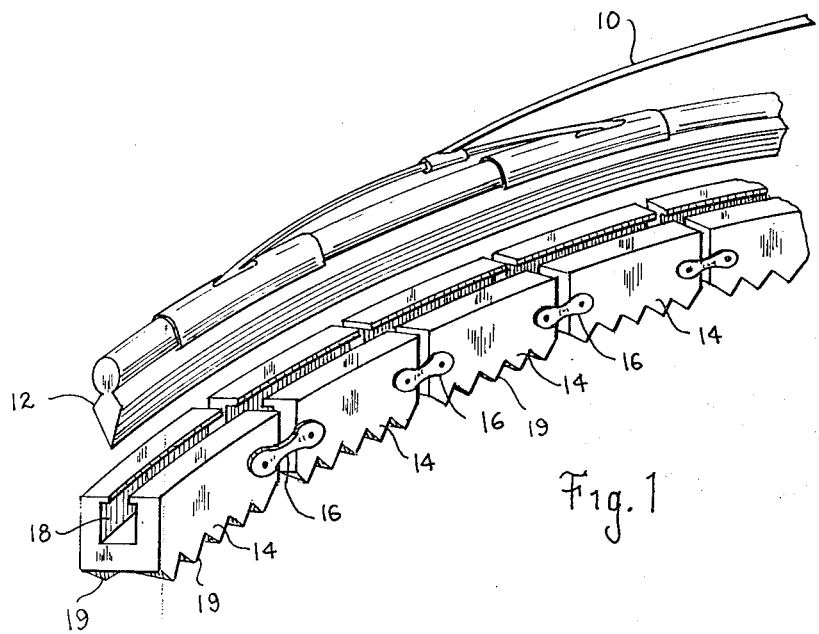
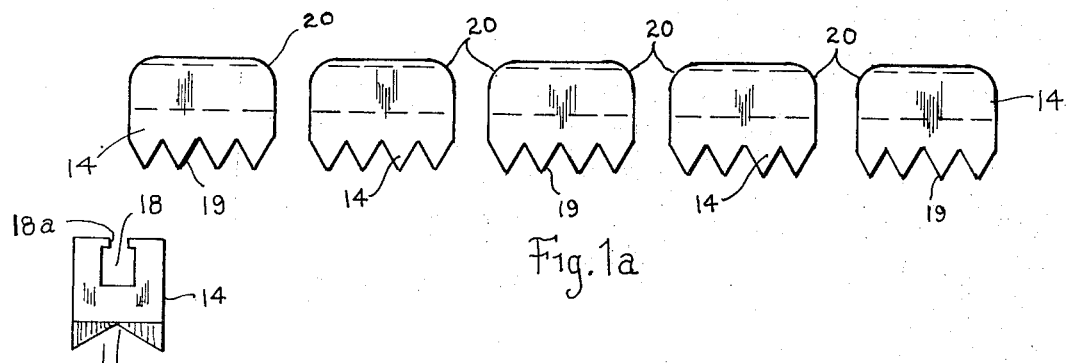
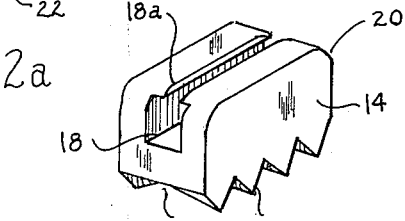
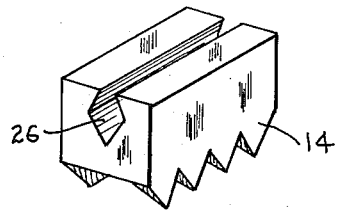

WINDSHIELD WIPER BLADE SNOW AND ICE SCRAPER ATTACHMENT

The present invention relates to a windshield scraper attachment that is adapted to removably fit over any standard vehicle wiper blade.

It is an object of the present invention to provide a segmented snow and ice scraper attachment for a windshield wiper blade in which the individual scraper blocks have radii at opposite ends so that the scraping device will freely follow the windshield contour.

Another object of the present invention is to provide scraper blocks which have a plurality of scraping teeth, and the center of the block is relieved to form a space for the clearance of ice chips.

A further object of the present invention is to provide a series of longitudinally aligned scraper blocks that are connected together by means of hinged chains or links.

Another object of the present invention is to provide a windshield scraping device having a multiplicity of interconnected free wheeling discs having teeth on its outer periphery. The discs are mounted on a flexible rod which is secured to the windshield wiper arm.

An object of the present invention is to provide interconnected scraper blocks for a vehicle windshield wiper which is inexpensive to manufacture and in which replacement can be easily and rapidly achieved.

An object of the present invention is to provide a scraping device for vehicular windshields which is reliably effective for the purposes intended.

The invention will now be more fully described with reference to the accompanying drawings in which:

FIG. 1 is a perspective view of the windshield wiper blade snow and ice scraper attachment removably secured to the wiper blade and constructed in accordance with the teachings of my invention;

FIG. 1a is a side elevational view of the scraper blocks with their interconnection removed;

FIG. 2 is a perspective view of an individual scraper block;

FIG. 2a is a front elevational view of the scraper block shown in FIG. 2;

FIG. 3 is a perspective view of another embodiment of the scraper block having a diamond-shaped wiper blade retaining slot;

FIG. 4 is a front elevational view of a further embodiment of the invention in which a different form of scraper is shown having hinged segments;

FIG. 4b is a front elevational view of the scraping element shown in FIG. 4a;

DESCRIPTION OF THE PREFERRED EMBODIMENTS

Figures 4, 4B:
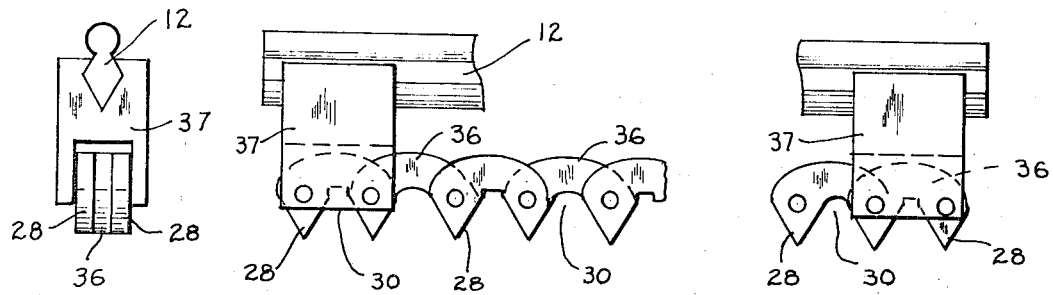

Referring particularly to FIGS. 1, 1a, 2, and 2a in which a standard vehicular windshield wiper arm 10 is shown provided with the usual hard rubber wiper blade 12, the scraping device is constituted of a multiplicity of individual scraper blocks 14. The individual scraper blocks 14 are arranged longitudinally and are interconnected by means of a hinged chain or flexible link 16. Each of the scraper blocks 14 is provided with a slot 18 of sufficient dimensions to permit the easy insertion and removal of a part of the wiper blade 12 therein. Moreover, the slot 18 is wide enough to permit limited movement of the wiper blade therein when the wiper blade is driven across the windshield by the wiper motor. It should be noted that each of the scraper blocks 14 has radii 20 which permit the blocks to individually follow the windshield contour. Furthermore, each block 14, as seen in FIG. 2a, is relieved at 22 which is approximately the center of the block. This construction results in the formation of a space 24 for the accumulation and disposal of ice chips. It will be noted that each of the blocks 14 is provided with two sets of teeth 19 at opposite edges thereof. It is preferred that the scraper blocks are fabricated of a rigid, durable plastic such as "Delrin." However, other suitable materials may be utilized within the teachings of the present invention. The blocks 14 are hinged together by means of links 16 so that the blocks form segments of a a windshield scraper device that articulates freely over the windshield.

FIG. 3 illustrates an alternate construction of the block 14 in which the internal slot 26 is diamond-shaped. This particular shape conforms to the cross section of the wiper blade 12 shown in FIG. 1. Thus, the blade 12 is held firmly in the slot 26 and any movement of the scraping device is substantially the result of the limited flexibility of the hard rubber wiper blade.

Figure 4A:
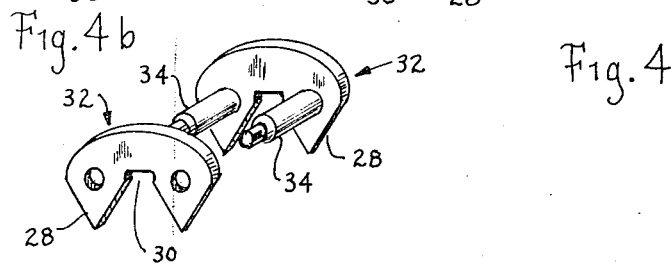
FIG. 4a is a perspective view of a single scraping element of the type used in the construction of FIG. 4.

FIGS. 4, 4a, and 4b show another construction of the scraper block 14 in which a plurality of scraper segments are shown, each having two sets of pointed scraper members 28 that are separated by an opening 30. Two opposite scraper segments form a unit 32 that is rigidly maintained in spaced relationship by means of rods 34. The units 32 are interconnected by links 36 that are similar in function to chains and permit flexibility of the scraping device while following the contour of the windshield. The end units 32 of the scraper members are removably fastened to the blade 12 by means of mounting blocks 37. It will be noted that each of the units 32 has sufficient spacing in the median portion thereof for ice chips to clear.

Figures 5, 6A:
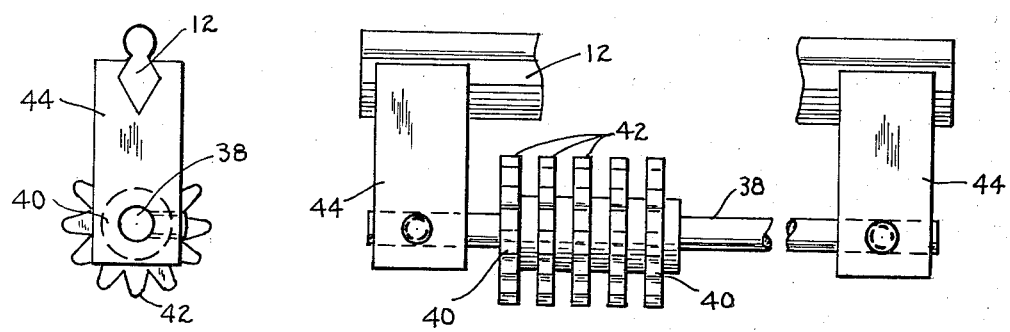
FIG. 5 is a side elevational view of an alternate construction having wheel-type scraper elements.
FIG. 6a is a front elevational view of the construction shown in FIG. 5.
Figure 6:
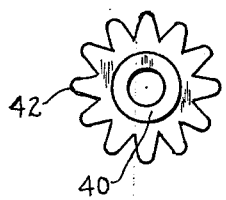
FIG. 6 is a front elevational view of one of the wheel-type scraper elements.

Referring now to FIGS. 5, 6, and 6a, the scraping device is shown in a further embodiment having a flexible rod 38 upon which are freely mounted wheel-type scraper elements 40. Each of the scraper elements is provided with circumferential teeth 42. The flexible rod 38 is secured to the wiper arm 10 by means of mounting blocks 44 so that when the windshield wiper blade 12 is operative, the rod and the scraper elements mounted thereon follow along. The teeth 42 of the free-wheeling elements 40 rotate and break up and scrape the ice on the windshield. In this construction also, the elements 40 are manufactured of a rigid plastic, such as "Delrin."

It should be pointed out that the links 16 may be in the form of conventional ball and socket structures (not shown) so that the scraper blocks 14 may freely articulate over the windshield.

What is claimed is:

1. An ice scraping attachment for a vehicular windshield wiper blade comprising a plurality of scraper elements aligned linearly, means for interconnecting said scraper elements whereby each of the scraper elements moves independently of the other scraper elements, and said scraper elements being provided with means for removably attaching the same to said wiper blade.

2. An ice scraping attachment for a vehicular windshield wiper blade as claimed in claim 1 wherein said means for connecting said scraper elements are flexible links.

3. An ice scraping attachment for a vehicular windshield wiper blade as claimed in claim 2 wherein said flexible links are hinged chains.

4. An ice scraping attachment for a vehicular windshield wiper blade as claimed in claim 1 wherein each of said scraper elements is a block having teeth and an internal slot with a top opening, said slot being of sufficient dimensions to accommodate said wiper blade which has a portion thereof that passes through said top opening.

5. An ice scraping attachment for a vehicular windshield wiper blade as claimed in claim 1 wherein said scraper elements are wheels having peripheral teeth, and a flexible rod having said wheels freely mounted thereon and being operatively connected to said wiper blade.

6. An ice scraping attachment for a vehicular windshield wiper blade as claimed in claim 4 wherein said internal slot has a rectangular cross-section.

7. An ice scraping attachment for a vehicular windshield wiper blade as claimed in claim 4 wherein said internal slot has a diamond-shaped cross-section.

8. An ice scraping attachment for a vehicular windshield wiper blade as claimed in claim 2 wherein said flexible links are ball and socket structures.

* * * * *